US012219510B2

(12) United States Patent
Sandberg

(10) Patent No.: US 12,219,510 B2
(45) Date of Patent: Feb. 4, 2025

(54) CLOCK SYNCHRONIZATION IN A CENTRALIZED RADIO ACCESS NETWORK HAVING MULTIPLE CONTROLLERS

(71) Applicant: CommScope Technologies LLC, Hickory, NC (US)

(72) Inventor: Stuart D. Sandberg, Acton, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 16/553,924

(22) Filed: Aug. 28, 2019

(65) Prior Publication Data

US 2020/0077355 A1 Mar. 5, 2020

Related U.S. Application Data

(60) Provisional application No. 62/724,493, filed on Aug. 29, 2018.

(51) Int. Cl.
*H04W 56/00* (2009.01)
*H04W 84/04* (2009.01)

(52) U.S. Cl.
CPC ...... *H04W 56/0015* (2013.01); *H04W 84/042* (2013.01)

(58) Field of Classification Search
CPC ........... H04W 56/0015; H04W 84/042; H04W 88/085; H04J 3/0667; H04J 3/0641
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |

(Continued)

FOREIGN PATENT DOCUMENTS

| | | |
|---|---|---|
| CN | 1719929 A | 1/2006 |
| CN | 101534507 A | 9/2009 |

(Continued)

OTHER PUBLICATIONS

U.S. Patent and Trademark Office, "Office Action", U.S. Appl. No. 15/942,285, Nov. 19, 2019, pp. 1-92, Published: US.

(Continued)

*Primary Examiner* — Harry H Kim
*Assistant Examiner* — Mohammed M Murshid
(74) *Attorney, Agent, or Firm* — Fogg & Powers LLC

(57) ABSTRACT

Embodiment are directed to systems and methods for use with a central radio access network (C-RAN) comprising a plurality of controllers and a plurality of radio points. Each of the controllers is configured to determine if that controller should serve as a timing master for the controllers and the radio points and, if that controller should serve as the timing master, synchronize the local clock of that controller with a master clock source over a backhaul network and transmit synchronization messages from that controller over a fronthaul network for reception by the other controllers and the radio points and for use by the other controllers and the radio points in synchronizing the local clocks thereof with the local clock of that controller. Other embodiments are disclosed.

20 Claims, 7 Drawing Sheets

(56) References Cited

U.S. PATENT DOCUMENTS

| | | |
|---|---|---|
| 6,788,249 B1 | 9/2004 | Farmer et al. |
| 6,985,451 B1 | 1/2006 | Nattiv et al. |
| 6,996,626 B1 | 2/2006 | Smith |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Chng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,948,897 B2 | 5/2011 | Stuart et al. |
| 7,948,964 B1 | 5/2011 | Khlat et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,670,363 B2 | 3/2014 | Tenny et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,743,718 B2 | 6/2014 | Grenier et al. |
| 8,750,271 B2 | 6/2014 | Jones |
| 8,774,134 B2 | 7/2014 | Raghothaman et al. |
| 8,781,483 B2 | 7/2014 | Chng |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,938,636 B1 | 1/2015 | Hochschild et al. |
| 8,942,136 B2 | 1/2015 | Humblet |
| 8,953,566 B2 | 2/2015 | Hegde et al. |
| 8,958,809 B2 | 2/2015 | Nama et al. |
| 8,982,841 B2 | 3/2015 | Srinivasan |
| 9,078,284 B2 | 7/2015 | Richardson |
| 9,230,000 B1 | 1/2016 | Hsieh et al. |
| 9,380,466 B2 | 6/2016 | Eyuboglu et al. |
| 9,414,399 B2 | 8/2016 | Eyuboglu et al. |
| 9,569,253 B1 | 2/2017 | Hsieh et al. |
| 9,877,340 B1 | 1/2018 | Park et al. |
| 9,936,470 B2 | 4/2018 | Eyuboglu et al. |
| 9,998,247 B1* | 6/2018 | Choudhury ........... H04J 3/0602 |
| 10,037,346 B1 | 7/2018 | Hsieh et al. |
| 10,057,916 B2 | 8/2018 | Barabell et al. |
| 10,064,072 B2 | 8/2018 | Eyuboglu et al. |
| 10,080,205 B2* | 9/2018 | Lovanna ............... H04J 3/0641 |
| RE47,545 E | 7/2019 | Grenier et al. |
| 10,666,372 B2* | 5/2020 | Goel .................... H04J 3/0682 |
| 10,764,846 B2 | 9/2020 | Eyuboglu et al. |
| 2002/0009974 A1 | 1/2002 | Kuwahara et al. |
| 2002/0107031 A1 | 8/2002 | Syrjarinne et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2003/0084190 A1 | 5/2003 | Kimball |
| 2003/0147348 A1 | 8/2003 | Jiang |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0036254 A1 | 2/2005 | Premerlani et al. |
| 2005/0073964 A1 | 4/2005 | Schmidt et al. |
| 2005/0073987 A1 | 4/2005 | Wu |
| 2005/0157675 A1 | 7/2005 | Feder et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0086487 A1 | 4/2007 | Yasuda et al. |
| 2007/0140218 A1 | 6/2007 | Nair et al. |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0022180 A1 | 1/2008 | Kuo |
| 2008/0043658 A1* | 2/2008 | Worrall ................ H04W 72/30 370/312 |
| 2008/0137606 A1 | 6/2008 | Zuniga et al. |

(56) References Cited

U.S. PATENT DOCUMENTS

| | | |
|---|---|---|
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2008/0244148 A1 | 10/2008 | Nix, Jr. et al. |
| 2009/0047913 A1 | 2/2009 | Kuru |
| 2009/0097444 A1 | 4/2009 | Lohr et al. |
| 2009/0135718 A1 | 5/2009 | Yeo et al. |
| 2009/0149189 A1 | 6/2009 | Sammour et al. |
| 2009/0149221 A1 | 6/2009 | Liu et al. |
| 2009/0161655 A1 | 6/2009 | Uppala |
| 2009/0180423 A1 | 7/2009 | Kroener |
| 2009/0180435 A1 | 7/2009 | Sarkar |
| 2009/0225743 A1 | 9/2009 | Nicholls et al. |
| 2009/0264142 A1 | 10/2009 | Sankar et al. |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0307554 A1 | 12/2009 | Marinier et al. |
| 2009/0310534 A1 | 12/2009 | Lindskog et al. |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0029295 A1 | 2/2010 | Touboul et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0067507 A1 | 3/2010 | Park |
| 2010/0069112 A1 | 3/2010 | Sun et al. |
| 2010/0098010 A1 | 4/2010 | Kuo |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0178875 A1 | 7/2010 | Oh et al. |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0028166 A1 | 2/2011 | Ketchum et al. |
| 2011/0081930 A1 | 4/2011 | Shimonabe et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0211447 A1 | 9/2011 | Wang et al. |
| 2011/0268007 A1 | 11/2011 | Barany et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0177153 A1 | 7/2012 | Cheng et al. |
| 2012/0188929 A1 | 7/2012 | Zhang et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Baj et al. |
| 2012/0294242 A1* | 11/2012 | Cheng ............... H04W 92/22 |
| | | 370/328 |
| 2012/0300635 A1 | 11/2012 | Jersenius et al. |
| 2012/0300710 A1* | 11/2012 | Li ..................... H04W 88/085 |
| | | 370/329 |
| 2012/0300766 A1 | 11/2012 | Chen et al. |
| 2012/0327882 A1 | 12/2012 | Park et al. |
| 2012/0329400 A1 | 12/2012 | Seo et al. |
| 2013/0016686 A1 | 1/2013 | Li et al. |
| 2013/0029711 A1 | 1/2013 | Kang et al. |
| 2013/0034197 A1 | 2/2013 | Aweya et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0194985 A1 | 8/2013 | Zetterman et al. |
| 2013/0201967 A1 | 8/2013 | Nentwig |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0281049 A1 | 10/2013 | Lee et al. |
| 2013/0294403 A1 | 11/2013 | Srinivasan |
| 2014/0003389 A1 | 1/2014 | Wang et al. |
| 2014/0006458 A1 | 1/2014 | Hsieh et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0133365 A1* | 5/2014 | Peng ..................... H04L 5/14 |
| | | 370/278 |
| 2014/0161070 A1 | 6/2014 | Chang et al. |
| 2014/0162664 A1 | 6/2014 | Stapleton et al. |
| 2014/0177549 A1 | 6/2014 | Knisely |
| 2014/0192826 A1 | 7/2014 | Zampetti |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2014/0321406 A1 | 10/2014 | Marinier et al. |
| 2015/0011219 A1 | 1/2015 | Saily et al. |
| 2015/0085720 A1 | 3/2015 | Gaal et al. |
| 2015/0085796 A1 | 3/2015 | Xu et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2016/0037550 A1* | 2/2016 | Barabell ............ H04W 72/046 |
| | | 455/450 |
| 2016/0044548 A1 | 2/2016 | Choi et al. |
| 2016/0134864 A1* | 5/2016 | Regev ................. H04L 43/12 |
| | | 348/192 |
| 2016/0302088 A1 | 10/2016 | Eyuboglu et al. |
| 2016/0309347 A1 | 10/2016 | Eyuboglu et al. |
| 2016/0323840 A1* | 11/2016 | Feng .................. H04J 14/0204 |
| 2016/0345342 A1 | 11/2016 | Eyuboglu et al. |
| 2017/0055235 A1* | 2/2017 | Rabii ................ H04N 21/4325 |
| 2017/0077607 A1 | 3/2017 | Han et al. |
| 2017/0099658 A1* | 4/2017 | Shattil .................. H04L 63/061 |
| 2017/0135121 A1 | 5/2017 | Eyuboglu et al. |
| 2017/0150464 A1 | 5/2017 | Kazehaya et al. |
| 2017/0163330 A1 | 6/2017 | Raleigh et al. |
| 2017/0195110 A1* | 7/2017 | Ruffini ................. H04L 7/0016 |
| 2017/0208473 A1* | 7/2017 | Chen .................. H04L 63/164 |
| 2017/0244648 A1* | 8/2017 | Tse ........................ H04L 47/28 |
| 2017/0251430 A1* | 8/2017 | Fazel Sarjoui ... H04W 52/0212 |
| 2017/0317790 A1 | 11/2017 | Yao et al. |
| 2017/0331575 A1* | 11/2017 | Ruffini .................. H04L 43/10 |
| 2017/0373890 A1* | 12/2017 | Fertonani ............ H04L 65/40 |
| 2017/0373982 A1* | 12/2017 | Ashwood-Smith ..... H04L 47/24 |
| 2018/0007709 A1 | 1/2018 | Seo et al. |
| 2018/0034669 A1* | 2/2018 | Barbieri .............. H04L 12/4604 |
| 2018/0076949 A1* | 3/2018 | Mayer .................. H04L 7/0075 |
| 2018/0206203 A1* | 7/2018 | Ruffini ................. H04J 3/0655 |
| 2018/0324726 A1* | 11/2018 | Griffioen ............. H04W 88/085 |
| 2019/0069190 A1 | 2/2019 | Eyuboglu et al. |

(56) References Cited

U.S. PATENT DOCUMENTS

| | | | |
|---|---|---|---|
| 2019/0075576 | A1 | 3/2019 | Eyuboglu et al. |
| 2019/0190635 | A1* | 6/2019 | Goel .................. H04W 56/001 |
| 2020/0351806 | A1 | 11/2020 | Eyuboglu et al. |

FOREIGN PATENT DOCUMENTS

| | | |
|---|---|---|
| CN | 102111180 A | 6/2011 |
| CN | 102340823 A | 2/2012 |
| CN | 103369582 A | 10/2013 |
| CN | 104145435 A | 11/2014 |
| CN | 105450491 A | 3/2016 |
| CN | 106797641 A | 5/2017 |
| CN | 108029083 A | 5/2018 |
| CN | 108370612 A | 8/2018 |
| CN | 108541360 A | 9/2018 |
| EP | 1134935 A2 | 9/2001 |
| EP | 1134935 B1 | 11/2008 |
| EP | 2352264 A1 | 8/2011 |
| EP | 2787646 A1 | 10/2014 |
| EP | 3094155 A1 | 11/2016 |
| KR | 20170050361 A | 5/2017 |
| WO | 2008144363 A3 | 3/2009 |
| WO | 2010078811 A1 | 7/2010 |
| WO | 2014124160 A2 | 8/2014 |
| WO | 2014153125 A1 | 9/2014 |
| WO | 2015191530 A2 | 12/2015 |
| WO | 2017100096 A1 | 6/2017 |
| WO | 2017184685 A1 | 10/2017 |
| WO | 2018017468 A1 | 1/2018 |

OTHER PUBLICATIONS

State Intellectual Property Office, P.R. China, "Office Action", from CN Application No. 201980056526.2, Apr. 28, 2023, from Foreign Counterpart to U.S. Appl. No. 16/553,924, pp. 1 through 7, Published: CN.

U.S. Patent and Trademark Office, "Notice of Allowance", U.S. Appl. No. 14/734,311, Apr. 19, 2018, pp. 1-12, Published: US.

U.S. Patent and Trademark Office, "Notice of Allowance", U.S. Appl. No. 14/734,311, Aug. 23, 2017, pp. 1-19, Published: US.

U.S. Patent and Trademark Office, "Notice of Allowance", U.S. Appl. No. 14/734,311, Dec. 14, 2017, pp. 1-14, Published: US.

U.S. Patent and Trademark Office, "Notice of Allowance", U.S. Appl. No. 15/189,473, Apr. 25, 2018, pp. 1-13, Published: US.

U.S. Patent and Trademark Office, "Notice of Allowance", U.S. Appl. No. 15/191,005, Mar. 20, 2018, pp. 1-13, Published: US.

U.S. Patent and Trademark Office, "Notice of Allowance", U.S. Appl. No. 15/191,005, Jul. 31, 2018, pp. 1-10, Published: US.

U.S. Patent and Trademark Office, "Notice of Allowance", U.S. Appl. No. 15/230,936, Feb. 9, 2018, pp. 1-10, Published: US.

U.S. Patent and Trademark Office, "Notice of Allowance", U.S. Appl. No. 15/230,936, Apr. 22, 2019, pp. 1-13, Published: US.

U.S. Patent and Trademark Office, "Notice of Allowance", U.S. Appl. No. 15/230,936, Jul. 2, 2018, pp. 1-15, Published: US.

U.S. Patent and Trademark Office, "Notice of Allowance", U.S. Appl. No. 15/230,936, Aug. 9, 2019, pp. 1-22, Published: US.

U.S. Patent and Trademark Office, "Notice of Allowance", U.S. Appl. No. 15/230,936, Oct. 29, 2018, pp. 1-15, Published: US.

U.S. Patent and Trademark Office, "Notice of Allowance", U.S. Appl. No. 15/231,384, Nov. 28, 2018, pp. 1-15, Published: US.

U.S. Patent and Trademark Office, "Notice of Allowance", U.S. Appl. No. 16/040,253, Sep. 18, 2019, pp. 1-17, Published: US.

U.S. Patent and Trademark Office, "Notice of Panel Decision from Pre-Appeal Brief Review", U.S. Appl. No. 13/762,292, Apr. 12, 2017, pp. 1-2, Published: US.

U.S. Patent and Trademark Office, "Office Action", U.S. Appl. No. 13/762,283, Nov. 21, 2014, pp. 1-39, Published: US.

U.S. Patent and Trademark Office, "Office Action", U.S. Appl. No. 13/762,284, Oct. 23, 2014, pp. 1-14, Published: US.

U.S. Patent and Trademark Office, "Office Action", U.S. Appl. No. 13/762,292, Dec. 30, 2015, pp. 1-25, Published: US.

U.S. Patent and Trademark Office, "Office Action", U.S. Appl. No. 14/734,311, Jul. 14, 2016, pp. 1-66, Published: US.

U.S. Patent and Trademark Office, "Office Action", U.S. Appl. No. 14/961,448, Aug. 7, 2019, pp. 1-48, Published: US.

U.S. Patent and Trademark Office, "Office Action", U.S. Appl. No. 14/961,448, Aug. 16, 2017, pp. 1-74, Published: US.

U.S. Patent and Trademark Office, "Office Action", U.S. Appl. No. 14/961,448, Jan. 22, 2019, pp. 1-39, Published: US.

U.S. Patent and Trademark Office, "Office Action", U.S. Appl. No. 15/189,473, Dec. 13, 2017, pp. 1-53, Published: US.

U.S. Patent and Trademark Office, "Office Action", U.S. Appl. No. 15/191,005, Sep. 27, 2017, pp. 1-48, Published: US.

U.S. Patent and Trademark Office, "Office Action", U.S. Appl. No. 15/230,936, Jan. 12, 2017, pp. 1-10, Published: US.

U.S. Patent and Trademark Office, "Office Action", U.S. Appl. No. 15/230,936, Jun. 15, 2017, pp. 1-60, Published: US.

U.S. Patent and Trademark Office, "Office Action", U.S. Appl. No. 15/231,384, filed Jul. 12, 2018, pp. 1-82, Published: US.

U.S. Patent and Trademark Office, "Office Action", U.S. Appl. No. 16/040,253, Feb. 1, 2019, pp. 1-68, Published: US.

U.S. Patent and Trademark Office, "Restriction Requirement", U.S. Appl. No. 13/762,292, May 27, 2015, pp. 1-6, Published: US.

U.S. Patent and Trademark Office, "Restriction Requirement", U.S. Appl. No. 16/182,392, Oct. 17, 2019, pp. 1-7, Published: US.

U.S. Patent and Trademark Office, "Supplemental Notice of Allowability from U.S. Appl. No. 15/189,473 mailed Jun. 5, 2018" pp. 1-6, Published in: US.

U.S. Patent and Trademark Office, "Supplemental Notice of Allowability", U.S. Appl. No. 15/189,473, Jun. 13, 2018, pp. 1-8, Published: US.

U.S. Patent and Trademark Office, "Supplemental Notice of Allowability", U.S. Appl. No. 15/191,005, Apr. 11, 2018, pp. 1-8, Published: US.

U.S. Patent and Trademark Office, "Supplemental Notice of Allowability", U.S. Appl. No. 15/191,005, Jun. 5, 2018, pp. 1-6, Published: US.

U.S. Patent and Trademark Office, "Supplemental Notice of Allowance", U.S. Appl. No. 15/191,005, Mar. 29, 2018, pp. 1-6, Published: US.

Zhu et al., "Virtual Base Station Pool: Towards a Wireless Network Cloud for Radio Access Networks", May 17, 10, pp. 1-10.

Andersen, "5G Ethernet X-Haul", White Paper, Jun. 2018, pp. 1-8, Transpacket Fusion Networks.

International Searching Authority, "International Search Report and Written Opinion from PCT Application No. PCT/US2019/048609", from Foreign Counterpart to U.S. Appl. No. 16/553,924, filed Dec. 17, 2019, pp. 1-10, Published: WO.

Mahmood et al., "Over-the-Air Time Synchronization for URLLC: Requirements, Challenges and Possible Enablers", Jun. 29, 2018, pp. 1-7.

Venmani et al., "On the Role of Network Synchronization for Future Cellular Networks: An Operator's Perspective", Communications Standards Supplement, Sep. 2016, pp. 58-64, IEEE Communications Magazine.

International Bureau, "International Preliminary Report on Patentability from PCT Application No. PCT/US2019/048609", from Foreign Counterpart to U.S. Appl. No. 16/553,924, filed Mar. 11, 2021, pp. 1 through 7, Published: WO.

Eidson, John, "IEEE-1588 Standard for a Precision Clock Synchronization Protocol for Networked Measurement and Control Systems—A Tutorial-", Oct. 10, 2005, Agilent Technologies, pp. 1 through 94, (c) 2005, Agilent Technologies.

Eidson, John, "IEEE-1588 Standard Version 2—A Tutorial-", Oct. 2, 2006, Agilent Technologies, pp. 1 through 21, (c) 2006, Agilent Technologies.

European Patent Office, "Extended European Search Report from EP Application No. 19854288.8" from Foreign Counterpart to U.S. Appl. No. 16/553,924, filed May 6, 2022, pp. 1 through 6, Published: EP.

(56) References Cited

OTHER PUBLICATIONS

U.S. Patent and Trademark Office, "Notice of Allowance", U.S. Appl. No. 16/934,852, filed May 2, 2022, pp. 1 through 10, Published: US.
U.S. Patent and Trademark Office, "Office Action", U.S. Appl. No. 17/898,938, filed Aug. 28, 2023, pp. 1 through 85, Published: US.
U.S. Patent and Trademark Office, "Advisory Action", U.S. Appl. No. 17/898,938, dated Apr. 3, 2024, pp. 1 through 4, Published: US.
U.S. Patent and Trademark Office, "Notice of Allowance", U.S. Appl. No. 15/942,285, filed Apr. 21, 2020, pp. 1 through 18, Published: US.
"3rd Generation Partnership Project; Technical Specification Group Radio Access Network; Evolved Universal Terrestrial Radio Access (E-UTRA); Requirements for support of radio resource management", 3GPP, Mar. 2008, pp. 1-25, 3GPP Organizational Partners.
"3rd Generation Partnership Project; Technical Specification Group Radio Access Network; Evolved Universal Terrestrial Radio Access (E-UTRA); Base Station (BS) radio transmission and reception", 3GPP, Dec. 2007, pp. 1-47, 3GPP Organizational Partners.
"Small Cell Virtualization Functional Splits and Use Cases", Small Cell Forum, Jun. 2015, pp. 1-58, www.smallcellforum.com.
Australian Government IP Australia, "Examination report No. 1 from AU Application No. 2015274867 dated Sep. 24, 2018", from Foreign Counterpart to PCT Application No. PCT/US2015/034829, Sep. 24, 2018, pp. 1-3, Published: AU.
Australian Government IP Australia, "Notice of Acceptance for patent application from AU Application No. 2015274867 mailed Apr. 16, 2019", from Foreign Counterpart to U.S. Appl. No. 14/734,311, pp. 1-3, Published: AU.
Belhouchet et al., "4G Wireless Systems, LTE Technology, Session 3: LTE Overview -Design Targets and Multiple Access Technologies", ITU/BDT Arab Regional Workshop, 2010, pp. 1-82, ERT.
China National Intellectual Property Administration, "First Office Action from CN Application No. 201580040533.5 mailed Jun. 26, 2019", from Foreign Counterpart to U.S. Appl. No. 16/040,253, pp. 1-29, Published: CN.
Dotsch, et al., "Quantitative Analysis of Split Base Station Processing and Determination of Advantageous Architectures for LTE", Bell Labs Technical Journal, 2013, pp. 1-24, vol. 18, No. 1, Wiley Periodicals.
European Patent Office, "Communication of European publication number and information on the application of Article 67(3) from EP Application No. 14707024.7 dated Nov. 18, 2015", from Foreign Counterpart to U.S. Appl. No. 13/762,283, Nov. 18, 2015, pp. 1, Published: EP.
European Patent Office, "Communication Pursuant to Article 94(3) from EP Application No. 14707024.7 dated Oct. 5, 2016", from Foreign Counterpart to U.S. Appl. No. 13/762,283, Oct. 5, 2016, pp. 1-6, Published: EP.
European Patent Office, "Communication Pursuant to Article 94(3) from EP Application No. 14707024.7 mailed May 2, 2018", "from Foreign Counterpart of U.S. Appl. No. 13/762,283", May 2, 2018, pp. 1-5, Published in: EP.
European Patent Office, "Communication pursuant to Article 94(3) from EP Application No. 15731443.6 dated Feb. 5, 2019", from Foreign Counterpart to U.S. Appl. No. 14/734,311, Feb. 5, 2019, pp. 1-5, Published: EP.
European Patent Office, "Communication pursuant to Article 94(3) from EP Application No. 15731443.6 dated Mar. 21, 2018", from Foreign Counterpart to U.S. Appl. No. 14/734,311, Mar. 21, 2018, pp. 1-7, Published: EP.
European Patent Office, "Communication under Article 94(3) from EP Application No. 14707024.7 mailed May 23, 2019", from Foreign Counterpart to U.S. Appl. No. 13/762,283, pp. 1-8, Published: EP.
European Patent Office, "Extended European Search Report from EP Application No. 16175955.0 dated Oct. 10, 2016", from Foreign Counterpart to U.S. Appl. No. 13/762,283, Oct. 10, 2016, pp. 1-10, Published: EP.
European Patent Office, "Extended European Search Report from EP Application No. 16175956.8 dated Oct. 10, 2016", from Foreign Counterpart to U.S. Appl. No. 13/762,283, Oct. 10, 2016, pp. 1-10, Published: EP.
European Patent Office, "Extended European Search Report from EP Application No. 16873637.9 mailed Jul. 5, 2019", from Foreign Counterpart to U.S. Appl. No. 14/961,448, pp. 1-13, Published: EP.
Garner, "IEEE 1588 Version 2", ISPCS, Sep. 24, 2008, pp. 1-89.
Haberland et al., "Base Stations in the Cloud", Alcatel-Lucent, Sep. 28, 12, pp. 1-23, www.alcatel-lucent.com.
International Bureau, "Notice Concerning Transmittal of International Preliminary Report on Patentability from PCT Application No. PCT/US2016/064750 dated Jun. 21, 18", from Foreign Counterpart to U.S. Appl. No. 14/961,448, Jun. 21, 18, pp. 1-11, Published: Switzerland.
International Bureau, "Notification Concerning the Transmittal of International Preliminary Report on Patentability from PCT Application No. PCT/US2015/034829 dated Dec. 22, 2016", from Foreign Counterpart to U.S. Appl. No. 14/734,311, Dec. 22, 2016, pp. 1-11, Published: Switzerland.
International Bureau, "Notification Concerning Transmittal of International Preliminary Report on Patentability from PCT Application No. PCT/US2014/015137 mailed Aug. 20, 2015", from Foreign Counterpart to U.S. Appl. No. 13/762,283, Aug. 20, 2015, pp. 1-13, Published: Switzerland.
International Searching Authority, "International Search Report from PCT Application No. PCT/US2014/015137 dated Sep. 22, 2014", from Foreign Counterpart to U.S. Appl. No. 13/762,283, Sep. 22, 2014, pp. 1-18, Published: EP.
International Searching Authority, "International Search Report from PCT Application No. PCT/US2015/034829 dated Dec. 8, 2015", from Foreign Counterpart to U.S. Appl. No. 14/734,311, Dec. 8, 2015, pp. 1-14, Published: EP.
International Searching Authority, "Invitation to Pay Additional Fees from PCT Application No. PCT/US2014/015137 dated Aug. 4, 2014", from Foreign Counterpart to U.S. Appl. No. 13/762,283, Aug. 4, 2014, pp. 1-8, Published: EP.
International Searching Authority, "Invitation to Pay Additional Fees from PCT Application No. PCT/US2015/034829 dated Oct. 1, 2015", from Foreign Counterpart to U.S. Appl. No. 14/734,311, Oct. 1, 2015, pp. 1-6, Published: EP.
International Searching Authority, "Notification of Transmittal of the International Search Report and Written Opinion of the International Searching Authority from PCT Application No. PCT/US2016/064750 dated Mar. 8, 2017", from Foreign Counterpart to U.S. Appl. No. 14/961,448, Mar. 8, 2017, pp. 1-14, Published: KR.
Ma et al., "RADIOSTAR: Providing Wireless Coverage Over Gigabit Ethernet", Bell Labs Technical Journal, 2009, pp. 1-18, vol. 14, No. 1, Wiley Periodicals.
U.S Patent and Trademark Office, "Corrected Notice of Allowability", U.S. Appl. No. 13/762,292, Dec. 15, 2017, pp. 1-6, Published: US.
U.S. Patent and Trademark Office, "Advisory Action", U.S. Appl. No. 13/762,292, Feb. 6, 2017, pp. 1-4, Published: US.
U.S. Patent and Trademark Office, "Advisory Action", U.S. Appl. No. 14/734,311, Jun. 20, 2017, pp. 1-2, Published: US.
U.S. Patent and Trademark Office, "Advisory Action", U.S. Appl. No. 14/961,448, Aug. 16, 2018, pp. 1-7, Published: US.
U.S. Patent and Trademark Office, "Corrected Notice of Allowability", U.S. Appl. No. 15/191,005, Aug. 15, 2018, pp. 1-6, Published: US.
U.S. Patent and Trademark Office, "Corrected Notice of Allowability", U.S. Appl. No. 15/230,936, Mar. 9, 2018, pp. 1-26, Published: US.
U.S. Patent and Trademark Office, "Corrected Notice of Allowability", U.S. Appl. No. 15/230,936, Aug. 24, 2018, pp. 1-10, Published: US.
U.S. Patent and Trademark Office, "Examiner-Initiated Interview Summary", U.S. Appl. No. 14/734,311, Mar. 23, 2017, p. 1, Published: US.
U.S. Patent and Trademark Office, "Final Office Action", U.S. Appl. No. 13/762,283, Aug. 21, 2015, pp. 1-47, Published: US.

(56) References Cited

OTHER PUBLICATIONS

U.S. Patent and Trademark Office, "Final Office Action", U.S. Appl. No. 13/762,292, Sep. 27, 2016, pp. 1-18, Published: US.
U.S. Patent and Trademark Office, "Final Office Action", U.S. Appl. No. 14/734,311, Apr. 7, 2017, pp. 1-53, Published: US.
U.S. Patent and Trademark Office, "Final Office Action", U.S. Appl. No. 14/961,448, Mar. 13, 2018, pp. 1-47, Published: US.
U.S. Patent and Trademark Office, "Final Office Action", U.S. Appl. No. 15/230,936, Nov. 8, 2017, pp. 1-48, Published: US.
U.S. Patent and Trademark Office, "Final Office Action", U.S. Appl. No. 16/040,253, Jul. 11, 2019, pp. 1-33, Published: US.
U.S. Patent and Trademark Office, "Notice of Allowability", U.S. Appl. No. 14/734,311, May 1, 2018, pp. 1-8. Published: US.
U.S. Patent and Trademark Office, "Notice of Allowance", U.S. Appl. No. 13/762,283, Apr. 1, 2016, pp. 1-9, Published: US.
U.S. Patent and Trademark Office, "Notice of Allowance", U.S. Appl. No. 13/762,284, May 8, 2015, pp. 1-5, Published: US.
U.S. Patent and Trademark Office, "Notice of Allowance", U.S. Appl. No. 13/762,284, Aug. 26, 2015, pp. 1-12, Published: US.
U.S. Patent and Trademark Office, "Notice of Allowance", U.S. Appl. No. 13/762,284, Dec. 18, 2015, pp. 1-7, Published: US.
U.S. Patent and Trademark Office, "Notice of Allowance", U.S. Appl. No. 13/762,292, Feb. 25, 2016, pp. 1-6, Published: US.
U.S. Patent and Trademark Office, "Notice of Allowance", U.S. Appl. No. 13/762,292, Jul. 28, 2017, pp. 1-8, Published: US.
U.S. Patent and Trademark Office, "Notice of Allowance", U.S. Appl. No. 13/762,292, Nov. 30, 2017, pp. 1-31, Published: EP.
U.S. Patent and Trademark Office, "Ex Parte Quayle", U.S. Appl. No. 16/934,852, filed Oct. 13, 2021, pp. 1 through 97, Published: US.
U.S. Patent and Trademark Office, "Notice of Allowance", U.S. Appl. No. 16/934,852, filed Jan. 13, 2022, pp. 1 through 8, Published: US.

* cited by examiner

CLOCK SYNCHRONIZATION IN A CENTRALIZED RADIO ACCESS NETWORK HAVING MULTIPLE CONTROLLERS

CROSS-REFERENCE TO RELATED APPLICATIONS

This application claims the benefit of U.S. Provisional Patent Application Ser. No. 62/724,493, filed on Aug. 29, 2018, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, a baseband unit (BBUs) (also referred to here as a "baseband controller" or simply a "controller") interacts with multiple remote units (also referred to here as "radio points" or "RPs"). Each controller is coupled to the radio points over fronthaul communication links or a fronthaul network.

Typically, each radio point is associated with a single controller and supports a single carrier provided by a wireless operator. If more than a single carrier's worth of capacity needs to be provided in a given coverage area or if multiple carriers are needed to provide service within a given coverage area, multiple radio points would typically be deployed within the same coverage area, with each of the radio points being associated with a different controller.

Each radio point is synchronized with its associated controller. That is, the local clock in each radio point is synchronized with the local clock in the associated controller. However, approaches used to synchronize the local clocks of radio points with the local clock of a single controller may not suitable for other C-RAN configurations.

SUMMARY

One embodiment is directed to a central radio access network (C-RAN) system. The C-RAN system comprises a plurality of controllers and a plurality of radio points. Each of the controllers and radio points comprises a respective local clock. Each of the radio points is associated with at least one antenna and is remotely located from the controllers, wherein the plurality of radio points is communicatively coupled to the controllers using a fronthaul network. The controllers and the plurality of radio points are configured to implement a plurality of base stations in order to provide wireless service to a plurality of user equipment (UEs). Each of the controllers is communicatively coupled to a core network of a wireless service provider over a backhaul network. Each of the controllers is communicatively coupled to a master clock source over the backhaul network. Each of the controllers is configured to determine if that controller should serve as a timing master for the controllers and the radio points. If a controller should serve as the timing master, that controller serves as the timing master for the controllers and the radio points, synchronizes the local clock of that controller with the master clock source over the backhaul network, and transmits synchronization messages from that controller over the fronthaul network for reception by the other controllers and the radio points and for use by the other controllers and the radio points in synchronizing the local clocks thereof with the local clock of that controller.

Another embodiment is directed to a method of distributing a clock in a central radio access network (C-RAN) system comprising a plurality of controllers and a plurality of radio points. Each of the controllers and radio points comprises a respective local clock. Each of the radio points is associated with at least one antenna and is remotely located from the controllers. The plurality of radio points is communicatively coupled to the controllers using a fronthaul network. The controllers and the plurality of radio points are configured to implement a plurality of base stations in order to provide wireless service to user equipment. Each of the controllers is communicatively coupled to a core network of a wireless service provider over a backhaul network. Each of the controllers is communicatively coupled to a master clock source over the backhaul network. The method comprises determining if a first of the controllers should serve as a timing master for the controllers and the radio points. The method further comprises, if said first controller should serve as the timing master, serving, by said first controller, as the timing master for the controllers and the radio points, synchronizing the local clock of said first controller with the master clock source over the backhaul network, and transmitting synchronization messages from said first controller over the fronthaul network for reception by the other controllers and the radio points and for use by the other controllers and the radio points in synchronizing the local clocks thereof with the local clock of said first controller.

Other embodiments are disclosed.

The details of various embodiments are set forth in the accompanying drawings and the description below. Other features and advantages will become apparent from the description, the drawings, and the claims.

DRAWINGS

Figure 4:
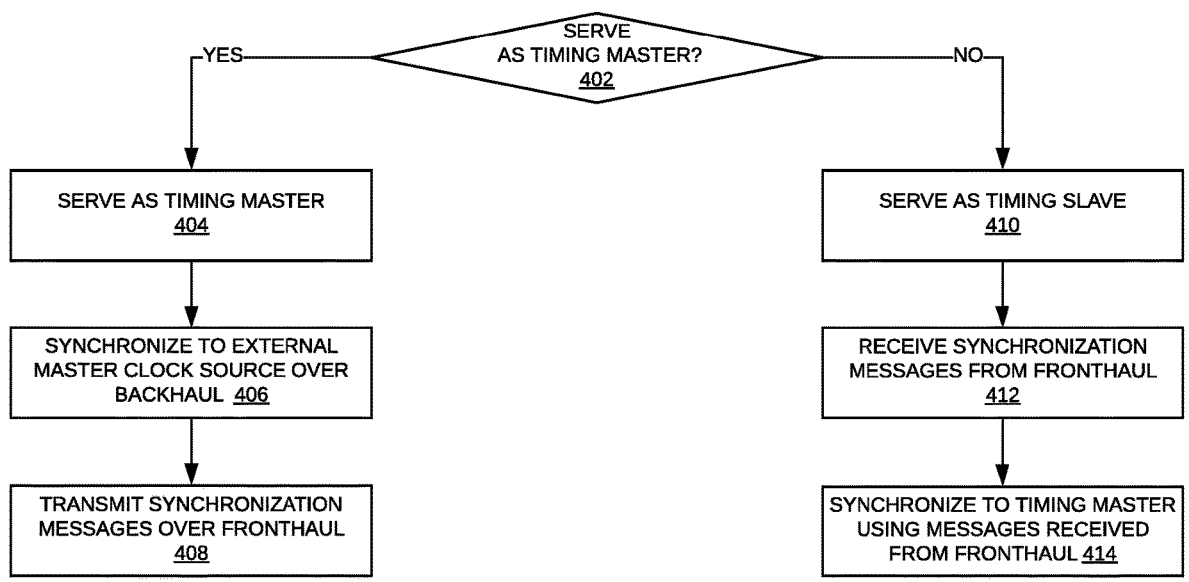

FIG. 4 comprises a high-level flowchart illustrating one exemplary embodiment of a method of distributing a clock in a C-RAN.

Figure 1:
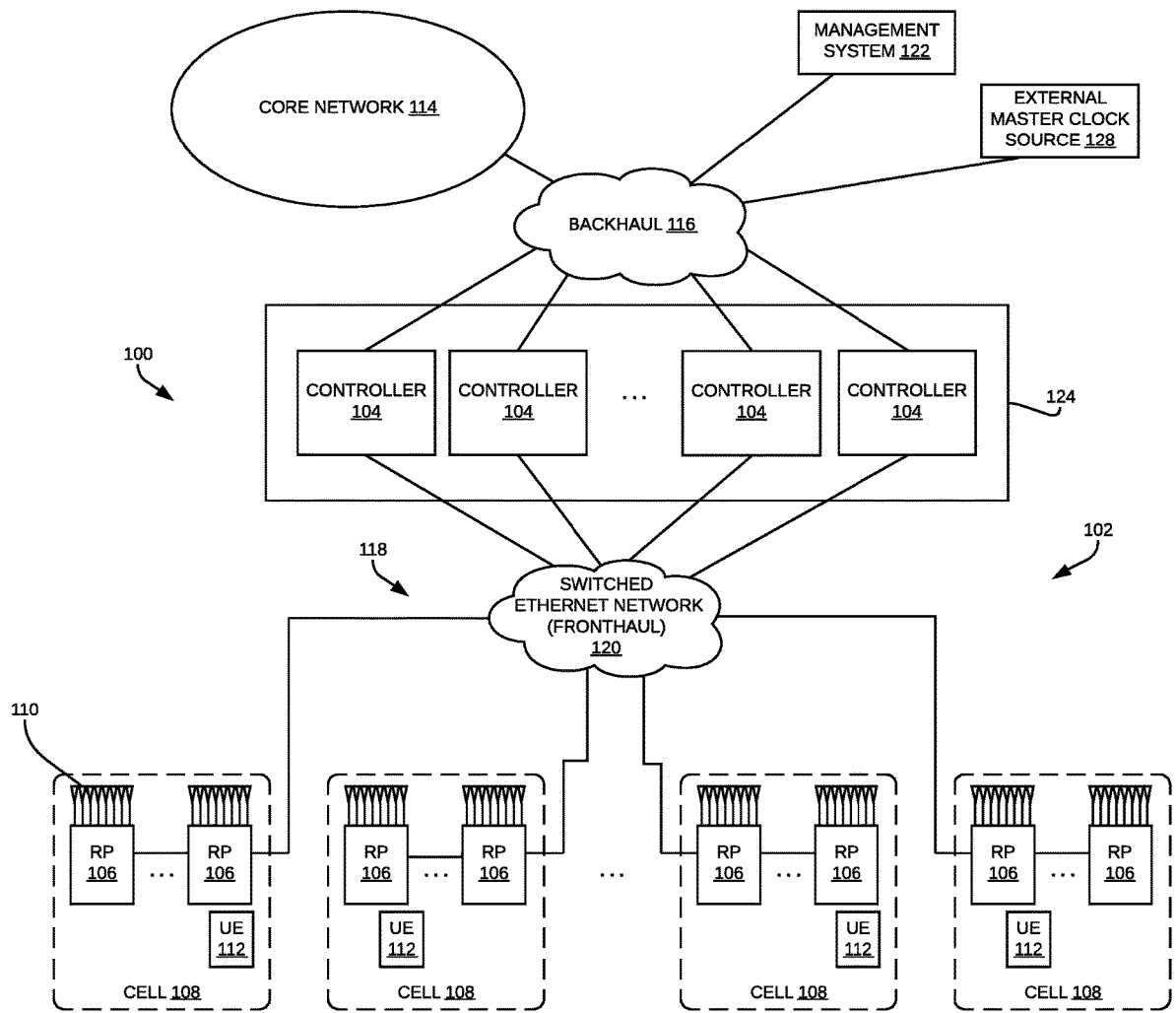
FIG. 1 is a block diagram illustrating one exemplary embodiment of a radio access network (RAN) system.
Figure 5:
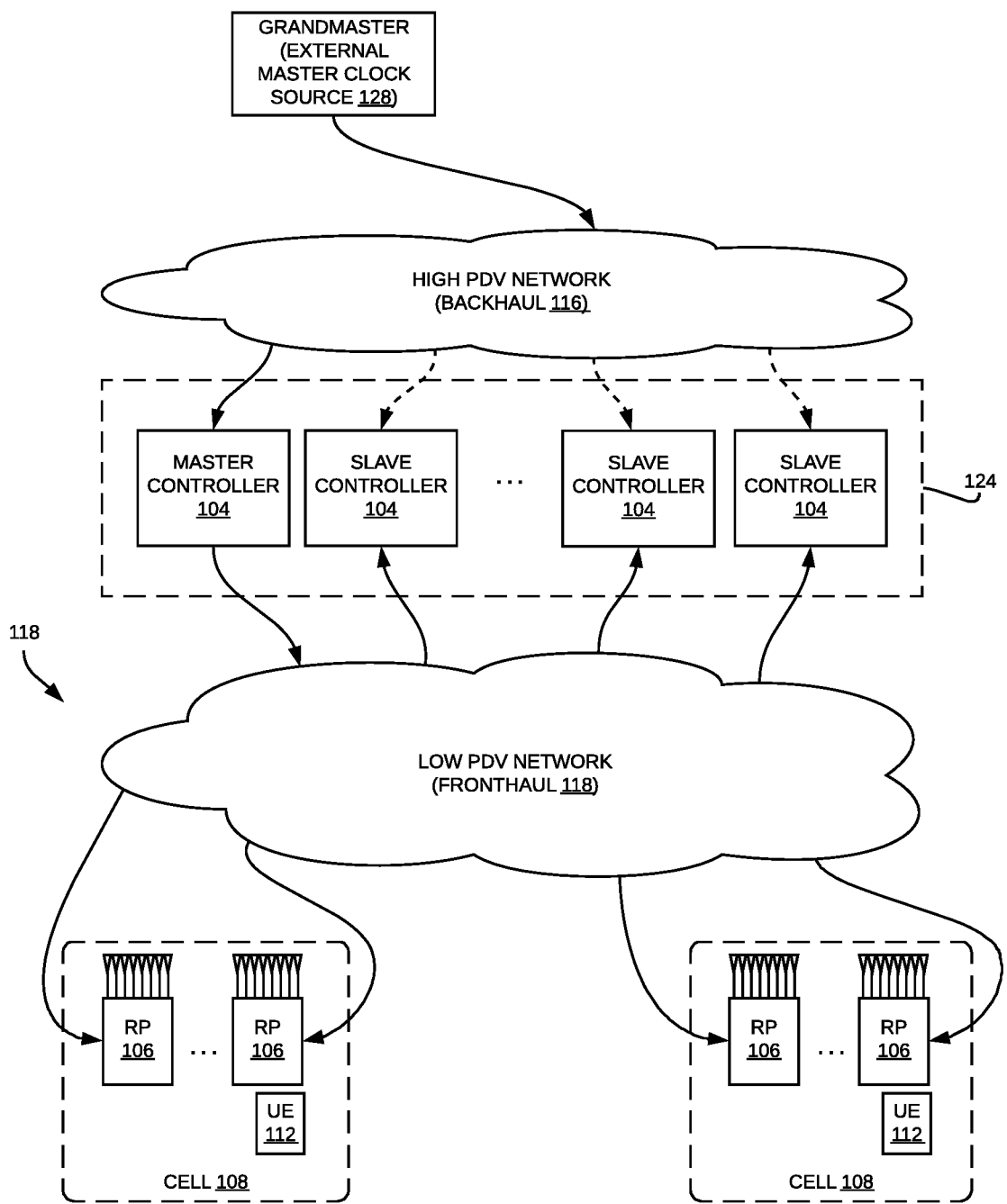

FIG. 5 is a block diagram depicting one example of the operation of method 400 in the RAN system of FIG. 1.

Figure 6:
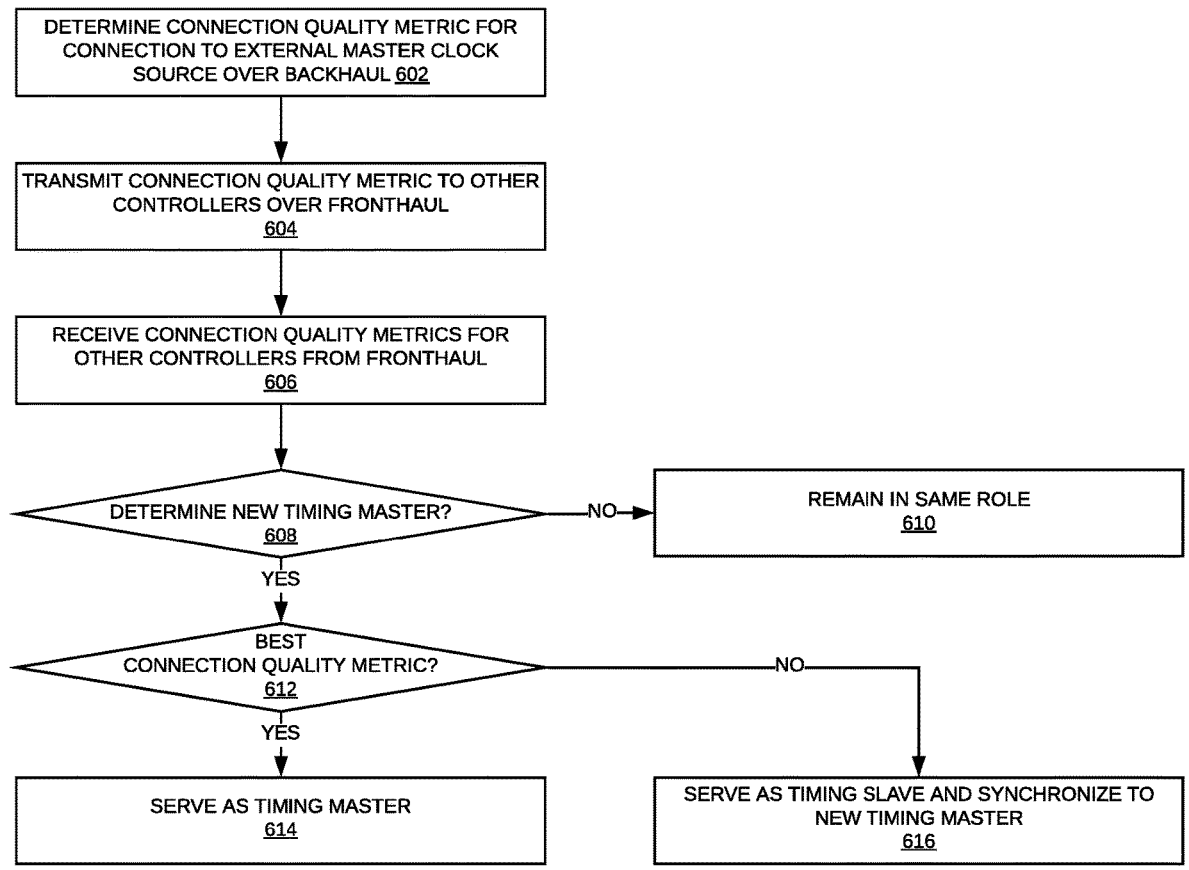

FIG. 6 comprises a high-level flowchart illustrating one exemplary embodiment of a method of designating a timing master for a C-RAN.

Like reference numbers and designations in the various drawings indicate like elements.

DETAILED DESCRIPTION

FIG. 1 is a block diagram illustrating one exemplary embodiment of a radio access network (RAN) system 100 in which the clock synchronization techniques described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs multiple baseband units 104 and multiple radio points (RPs) 106. The system 100 is also referred to here as a "C-RAN system" 100. Each RP 106 is remotely located from the baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors or configuring a programmable device. Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate backhaul 116 (including, for example, a wide area network). In the exemplary embodiment shown in FIG. 1, the Internet is used for backhaul 116 between the system 100 and each core network 114. However, it is to be understood that the backhaul 116 can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (in the case of voice using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGW) and a Security Gateway (SeGW) (all of which are not shown). Each controller 104 communicates with the MME and SGW in the EPC core network 114 using the LTE S1 interface over an Internet Protocol Security (IPsec) tunnel established with the SeGW. Also, each controller 104 communicates with other eNodeBs (over the IPsec tunnel) using the LTE X2 interface. For example, each controller 104 can communicate via the LTE X2 interface with an outdoor macro eNodeB (not shown) or another controller 104 in the same cluster 124 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam-forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple air interfaces and/or to support multiple wireless operators.

The controllers 104 are communicatively coupled the radio points 104 using a fronthaul network 118 (including, for example, a local area network). In the exemplary embodiment shown in FIG. 1, the fronthaul 118 that communicatively couples each controller 104 to one or more RPs 106 is implemented using a standard switched ETHERNET network 120. However, it is to be understood that the fronthaul between the controllers 104 and RPs 106 can be implemented in other ways.

In the exemplary embodiment shown in FIG. 1, a management system 122 is communicatively coupled to the controllers 104 and RPs 106, for example, via the back-haul 116 and ETHERNET network 120 (in the case of the RPs 106).

In the exemplary embodiment shown in FIG. 1, the management system 122 communicates with the various elements of the system 100 using the backhaul 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1, the system 100 comprises multiple controllers 104 that are grouped together into a cluster 124. Each cluster 124 has an associated set of RPs 106 that have been assigned to that cluster 124 and the cells 108 served by the controllers 104 included in that cluster 124. The association of radio points 106 with cells 108 served by the cluster 124 is implemented using a "white list". For each radio point 106 that is associated with a cell 108, the white list includes an identifier (for example, a media access control (MAC) address) for that radio point 106 that the white list associates with an identifier for that cell 108 (for example, a logical or virtual cell identifier used within the context of the C-RAN 100). When a controller 104 is configured to serve a particular cell 108 it can reference the white list to determine which radio points 106 it should associate with in order to serve that cell 108.

In this example, at least some of the RPs 106 are implemented as multi-carrier radio points 106 and at least some of the RPs 106 are implemented as single-carrier radio points 106. The C-RAN 100 can be implemented using various numbers of multi-carrier radio points 106 and/or single-carrier radio points 106 (including implementations in which only multi-carrier radio points 106 are used, implementations in which only single-carrier radio points 106 are used, and implementations in which combinations of both single-carrier radio points 106 and multi-carrier radio points 106 are used).

Figure 2A:
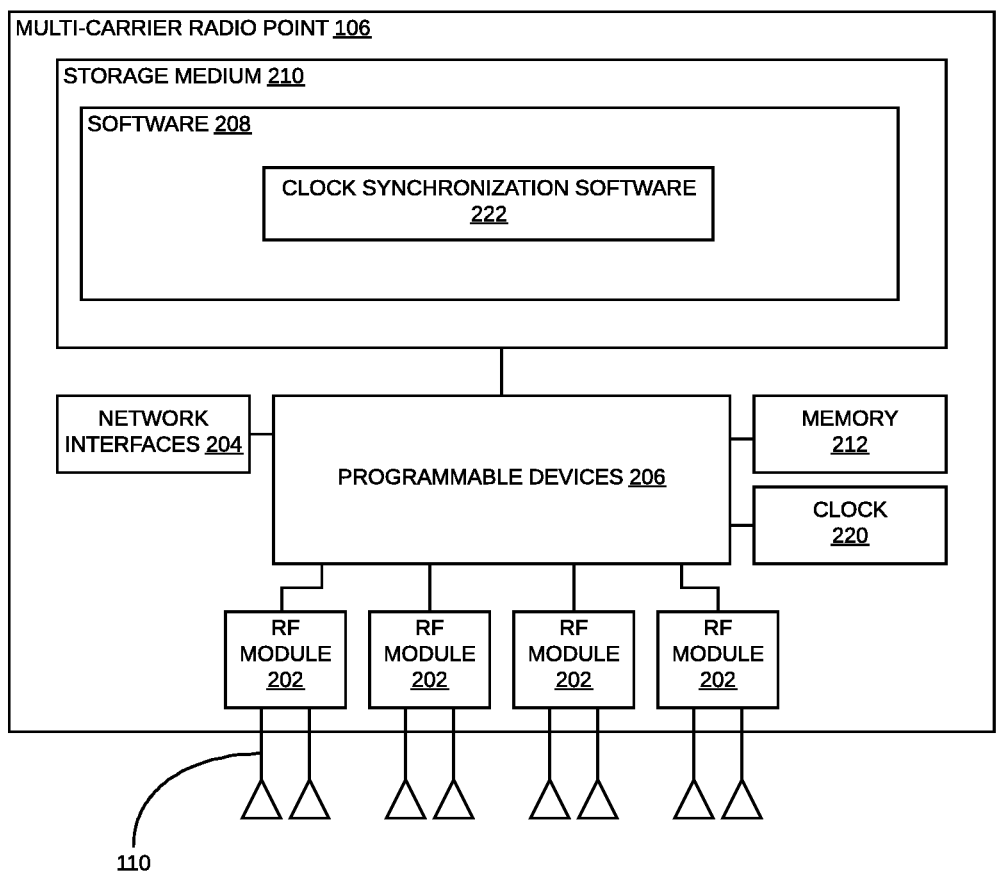
FIG. 2A is a block diagram illustrating one exemplary embodiment of a multi-carrier radio point.

FIG. 2A is a block diagram illustrating one exemplary embodiment of a multi-carrier radio point 106. As shown in FIG. 2, each multi-carrier radio point 106 comprises a plurality of radio frequency (RF) modules 202. Each RF module 202 comprises circuitry that implements the RF transceiver functions for an air interface and interfaces to one or more antennas 110 associated with that RF module 202. More specifically, in the exemplary embodiment shown in FIG. 2A, each RF module 202 interfaces with a respective two antennas 110 and comprises circuitry that implements two downlink signal paths, one for each of the two antennas 110, and two uplink signals paths, one for each of the two antennas 110.

In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to downconvert the received uplink analog RF signal to an uplink analog intermediate frequency signal, a respective analog-to-digital converter (ADC) to convert the uplink analog intermediate frequency signal to uplink digital samples. Each of the downlink and uplink signal paths can also include other conventional elements such as filters and additional amplifiers. Each RF module 202 can be implemented using one or more RF integrated circuits (RFICs) and/or discrete components.

Each multi-carrier radio point 106 further comprises at least one network interface 204 that is configured to communicatively couple the radio point 106 to the fronthaul network 118. More specifically, in the exemplary embodiment shown in FIG. 2A, each network interface 204 comprises an ETHERNET network interface that is configured to communicatively couple that radio point 106 to the switched ETHERNET network 120 that is used to implement the front-haul 118 for the C-RAN 100.

Each multi-carrier radio point 106 further comprises one or more programmable devices 206 that execute, or are otherwise programmed or configured by, software, firmware, or configuration logic 208 (collectively referred to here as "software"). The one or more programmable devices 206 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices 206 are used, all of the programmable devices 206 do not need to be implemented in the same way.

The software 208 can be implemented as program instructions or configuration logic that are stored (or otherwise embodied) on an appropriate non-transitory storage medium or media 210 from which at least a portion of the program instructions or configuration logic are read by one or more programmable devices 206 for execution thereby or configuration thereof. The software 208 is configured to cause one or more devices 206 to carry out at least some of the functions described here as being performed by the radio point 106. Although the storage medium 210 is shown in FIG. 2A as being included in the radio point 106, it is to be understood that remote storage media (for example, storage media that is accessible over a network) and/or removable media can also be used. Each radio point 106 also comprises memory 212 for storing the program instructions or configuration logic and/or any related data while the functions implemented by the software 208 are performed.

The software 208, in relevant part, comprises clock synchronization software 222 that is configured to synchronize the local clock 220 of the radio point 106 as described in more detail below.

The multi-carrier radio point 106 is configured to enable processing resources provided by the one or more programmable devices 206 and the hardware resources provided by the RF modules 202 to be flexibly assigned and associated with various carriers and cells 108 used for providing wireless service to UEs 112. As used herein, a "carrier" refers to a logical bi-directional RF channel used for wirelessly communicating with the UEs 112. Where frequency division duplexing (FDD) is used, each "carrier" comprises a respective physical downlink RF carrier used for downlink transmissions and a respective physical uplink RF carrier used for uplink transmissions. Where time division duplexing (TDD) is used, each "carrier" comprises a single physical RF carrier that is used for both downlink and uplink transmissions.

The multi-carrier radio point 106 is configured so that the processing and hardware resources provided by the radio point 106 can be associated with controllers 104 in the cluster 124 in a flexible manner. A single multi-carrier radio point 106 can be used with multiple controllers 104 to serve multiple cells 108, where the processing and hardware resources used for the multiple controllers 104 need not be configured and used in the same way. The multi-carrier radio point 106 is not "hardwired" to operate in certain radio point configurations. Instead, the multi-carrier radio point 106 can be configured at run-time to use the desired radio point configurations. Each controller 104 that is used with the multi-carrier radio point 106 can be configured to automatically discover each associated radio point 106 and claim and configure the resources it needs from those that are provided by each radio point 106.

For example, an RF plan can be developed for the site 102 that identifies where the coverage areas of the various cells 108 need to be located and where radio points 106 need to be deployed in order to provide the desired coverage areas. The association of radio points 106 and cells 108 can be configured by specifying which radio points 106 are to be associated with each cell 108. As noted above, the association of radio points 106 with cells 108 can be implemented using a white list. When a controller 104 in the cluster 124 is configured to serve a particular cell 108, the controller 104 can be configured to the white list to determine which radio points 106 should be homed to that controller 104 in order to serve that cell 108. Also, the configuration information maintained with the white list can also specify what resources of each assigned radio point 106 should be used to serve the associated cell 108 and how they should be configured. The controller 104 then uses this information to claim and configure the relevant resources of the assigned radio points 106 at run time. In this way, the various radio points 106 do not need to be individually manually configured. Instead, the controllers 104 can automatically discover, claim, and configure the resources provided by the multi-carrier radio points 106. The controllers 104 and radio points 106 can be configured to be discovered and configured in other ways.

Figure 2B:
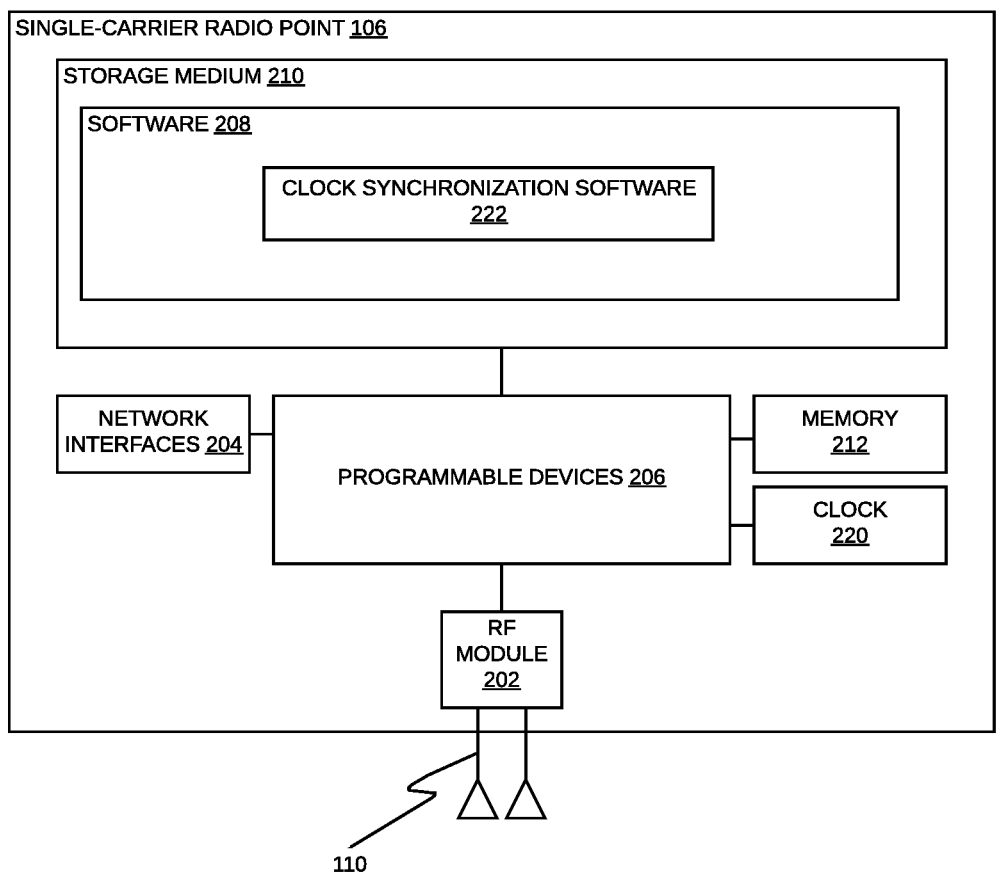
FIG. 2B is a block diagram illustrating one exemplary embodiment of a single-carrier radio point.

FIG. 2B is a block diagram illustrating one exemplary embodiment of a single-carrier radio point 106. Except as described below, the single-carrier radio point 106 is implemented in a similar manner as the multi-carrier radio point 106 shown in FIG. 2A, where elements of the single-carrier radio point 106 shown in FIG. 2B that correspond to elements of the multi-carrier radio point 106 shown in FIG. 2A are referenced in FIG. 2B using the same reference numerals used in FIG. 2A and where the description of such corresponding elements set forth above in connection with FIG. 2A also applies to the single-carrier radio point 106 shown in FIG. 2B and is not repeated below for the sake of brevity. The primary differences between the single-carrier radio point 106 of FIG. 2B and the multi-carrier radio point 106 of FIG. 2A are that the single-carrier radio point 106 of FIG. 2B comprises a single radio frequency (RF) module 202 that interfaces with a respective two antennas 110 and the associated processing and other resources of the single-carrier radio point 106 are scaled and configured to support only a single carrier.

Figure 3:
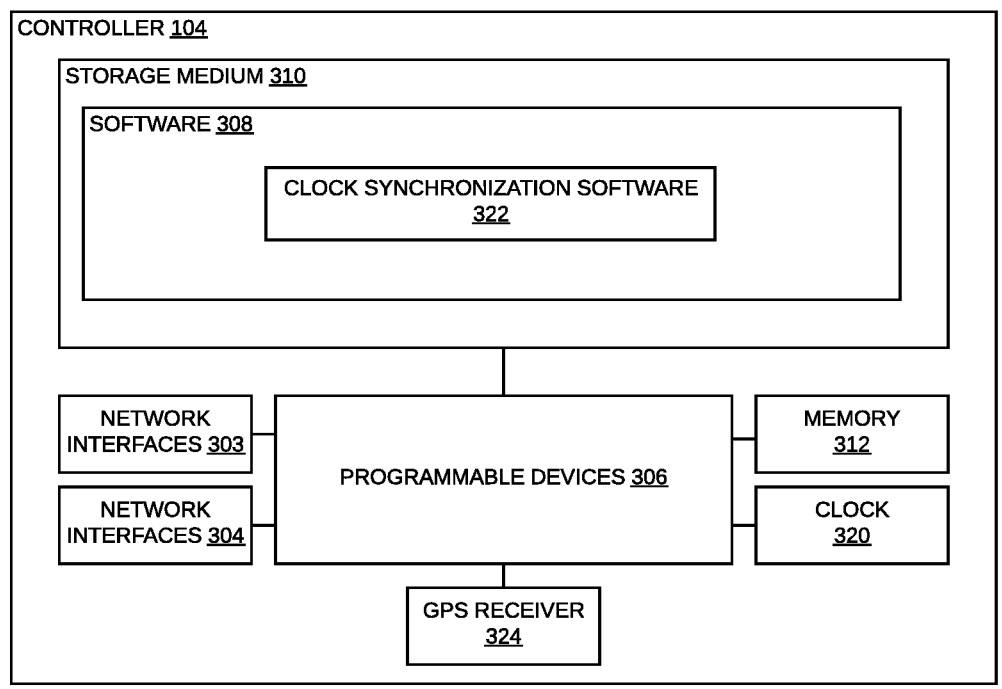
FIG. 3 is a block diagram illustrating one exemplary embodiment of a controller.

FIG. 3 is a block diagram illustrating one exemplary embodiment of a controller 104. Each controller 104 further comprises at least one network interface 303 that is configured to communicatively couple the controller 106 to the backhaul network 116 and at least one network interface 304 that is configured to communicatively couple the controller 106 to the fronthaul network 118. More specifically, in the exemplary embodiment shown in FIG. 3, each network interface 303 and 304 comprises an ETHERNET network interface that is configured to communicatively couple that controller 104, respectively, to the backhaul network 116 and to the switched ETHERNET network 120 that is used to implement the front-haul 118 for the C-RAN 100.

Each controller 104 further comprises one or more programmable devices 306 that execute, or are otherwise programmed or configured by, software, firmware, or configuration logic 308 (collectively referred to here as "software"). The one or more programmable devices 306 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices 306 are used, all of the programmable devices 306 do not need to be implemented in the same way.

The software 308 can be implemented as program instructions or configuration logic that are stored (or otherwise embodied) on an appropriate non-transitory storage medium or media 310 from which at least a portion of the program instructions or configuration logic are read by one or more programmable devices 306 for execution thereby or configuration thereof. The software 308 is configured to cause one or more devices 306 to carry out at least some of the functions described here as being performed by the controller 104. Although the storage medium 310 is shown in FIG. 3 as being included in the controller 104, it is to be understood that remote storage media (for example, storage media that is accessible over a network) and/or removable media can also be used. Each controller 104 also comprises memory 312 for storing the program instructions or configuration logic and/or any related data while the functions implemented by the software 308 are performed.

The software 308, in relevant part, comprises clock synchronization software 322 that is configured to synchronize the local clock 125 of the controller 104 as described in more detail below.

Also, in the exemplary embodiment shown in FIG. 3, the controller 104 further comprises a Global Positioning System (GPS) receiver 324.

Generally, for each cell 108 implemented by the C-RAN 100, the corresponding controller 104 (and the associated software 308) performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions. Different splits in the air-interface L1 processing between the controller 104 and the radio points 106 can be used.

For example, with one L1 split, each baseband controller 104 is configured to perform all of the digital Layer-1, Layer-2, and Layer-3 processing for the air interface, while the RPs 106 implement only the analog RF transceiver functions for the air interface and the antennas 110 associated with each RP 106. In that case, in-phase and quadrature (IQ) data representing time-domain symbols for the air interface is communicated between the controller 104 and the RPs 106.

In another example, a different L1 split is used in order to reduce the amount of data front-hauled between the controller 104 and the RPs 106. With this L1 split, the data front-hauled between the controller 104 and the RPs 106 is communicated as IQ data representing frequency-domain symbols for the air interface. This frequency-domain IQ data represents the symbols in the frequency domain before the inverse fast Fourier transform (IFFT) is performed, in the case of the downlink, and after the fast Fourier transform (FFT) is performed, in the case of the uplink. If this L1 split is used for downlink data, the IFFT and subsequent transmit L1 processing would be performed in each RP 106. Also, if this L1 split is used for uplink data, the FFT and subsequent receive L1 processing would be performed in the controller 104.

The front-hauled IQ data can also be quantized in order to reduce the amount of fronthaul bandwidth that is required. The quantization can be performed using any suitable quantization technique. Also, quantization can also be used where the front-hauled IQ data comprises time-domain symbols.

Additional details regarding front-hauling frequency-domain IQ data can be found in U.S. patent application Ser. No. 13/762,283, filed on Feb. 7, 2013, and titled "RADIO ACCESS NETWORKS," which is hereby incorporated herein by reference.

The L1-split used for downlink fronthaul data (that is, data front-hauled from the controller 104 to the RPs 106) can differ from the L1-split used for downlink fronthaul data (that is, data front-hauled from the RPs 106 to the controller 104). Also, for a given direction (downlink or uplink), not all fronthaul data needs to be communicated in the same form (that is, the fronthaul data for different channels or for different resource blocks can be communicated in different ways).

In the exemplary embodiment shown in FIGS. 2A and 2B, each radio point 106 further comprises a single local clock 220. In particular, each multi-carrier radio point 106 comprises a single local clock 220. Likewise, in the exemplary embodiment shown in FIG. 3, each controller 104 includes a single local clock 320. As noted above, each carrier served by a multi-carrier radio point 106 is associated with one of the controllers 104 in the cluster 124. The processing resources in the multi-carrier radio point 106 that are assigned to all of the carriers served by the multi-carrier radio point 106 all use the same clock 220 even though the processing resources in the multi-carrier radio point 106 that are assigned to an individual carrier will exchange baseband IQ and control data over the fronthaul network 120 with the particular controller 104 that serves that carrier. Thus, a single multi-carrier radio point 106 will typically interact with multiple controllers 104, each of which has its own local clock 320.

For a given cell 108, the local clocks 220 of the radio points 106 serving that cell 108 must be tightly synchronized in order to ensure good performance when simulcasting from two or more of those radio points 106 to a given UE 112. Furthermore, the processing performed by the processing resources assigned to each cell 108 in each radio point 106 is repeated for each 1 ms subframe (TTI), and, for each TTI, relies on timely reception of new blocks (packets) of downlink IQ data from the controller 104. Since a single local clock 220 is used by the processing resources assigned to all of the carriers served by a given multi-carrier radio point 106, this local clock 220 must have good synchronization with the local clocks 320 of all of the controllers 104 that the multi-carrier radio point 106 is served by.

When each of the controllers 104 has access to GPS signals, each controller 104 can use the GPS receiver 324 to independently synchronize its local clock 320 to the GPS clock and the resulting differential errors between the local clocks 320 in the various controllers 104 in the cluster 124 will be small. Put another way, in this GPS example, the GPS clock serves as the master clock source (also referred to here as the "grandmaster").

In many installations, the controllers 104 do not have access to GPS signals (for example, the controllers 104 are deployed indoors without GPS signal reception) and, instead, must synchronize to a master clock source 128 that is accessed via a wide area network (WAN) used to implement the back-haul 116 (for example, the Internet). This synchronization can be done using the Institute of Electrical and Electronics Engineers (IEEE) 1588 Precision Time Protocol (PTP). However, the backhaul 116 over which the controllers 104 synchronize to the master clock source 128 typically experiences high packet delay variation (PDV). This can result in large differential errors among the local clocks 320 of the various controllers 104 in the cluster 124 when the local clocks 320 of the various controllers 104 are independently synchronized to the same master clock source 128. The resulting large differential errors among the local clocks 320 of the various controllers 104 in the cluster 124 can cause downlink IQ data front-hauled from the controllers 104 to the various radio points 106 to be received out of alignment.

In order to address these issues and provide good synchronization the local clocks 320 of the controllers 104 and the local clocks 220 of the various radio points 106, the controllers 104 and the radio points 106 are configured to implement the clock distribution scheme described below.

FIG. 4 comprises a high-level flowchart illustrating one exemplary embodiment of a method 400 of distributing a clock in a C-RAN 100. The embodiment of method 400 shown in FIG. 4 is described here as being implemented using the C-RAN 100, radio points 106, and controllers 104 described above in connection with FIGS. 1, 2A-2B, 3, and 5, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

In general, the processing associated with method 400 is performed by each of the controllers 104 in the cluster 124 (and, in particular, at least in part by the clock synchronization software 322 in each controller 104).

Method 400 comprises determining if each controller 104 should serve as the timing master for the cluster 124 and the associated radio points 106 (block 402). Details regarding how each controller 104 makes the determination as to whether or not to serve as the timing master for the cluster 124 and associated radio points 106 are described below in connection with FIG. 6.

Method 400 further comprises operating a controller 104 as the timing master for the cluster 124 and associated radio points 106 (block 404) if that controller 104 determines that it should do so. As used here, the "master controller" 104 refers to the particular controller 104 that is serving as the timing master for the cluster 124 and associated radio points 106. When a controller 104 is the master controller 104, it synchronizes its clock 320 with the external master clock source 128 over the backhaul 116 (which is a high PDV network) (block 406). In this exemplary embodiment, the master controller 104 uses the IEEE 1588 protocol to synchronize its local clock 320 with the external master clock source 128 over the backhaul 116. With respect to the synchronization of its local clock 320 with the external master clock source 128, the master controller 104 acts as an IEEE 1588 "timing slave" with respect to the external master clock source 128 (with the external master clock source 128 acting as the "grandmaster"). The master controller 104 initiates a session with the external master clock source 128 so that the controller 104 can receive synchronization messages transmitted from the external master clock source 128. The master controller 104 uses the received synchronization messages to synchronizes its local clock 320 with the external master clock source 128. This is illustrated in FIG. 5, which depicts one example of the operation of method 400 in the RAN system 100 of FIG. 1.

Method 400 further comprises synchronizing the local clocks 320 of the other controllers 104 in the cluster 124 and the local clocks 220 of the associated radio points 106 to the local clock 320 of the master controller 104 over the fronthaul 120 (which is a low PDV network) (block 408). In this exemplary embodiment, the controllers 104 in the cluster 124 and the associated radio points 106 also use the IEEE 1588 protocol over the front-haul switched Ethernet network 120. With respect to synchronization of its local clock 320 with the local clocks 320 of the other controllers 104 in the cluster 124 and the local clocks 220 of the associated radio points 106, the master controller 104 acts as an IEEE 1588 timing master, with the other controllers 104 in the cluster 124 and the associated radio points 106 acting as IEEE 1588 timing slaves. The master controller 104 broadcasts synchronization messages to the other controllers 104 in the cluster 124 and the associated radio points 106 over the fronthaul switched Ethernet network 120 (the low PDV network). The other controllers 104 in the cluster 124 and the radio points 106 use the received synchronization messages to synchronizes their local clocks 320 and 220 with the local clock 320 in the master controller 104. This is also illustrated in FIG. 5.

Method 400 further comprises operating each controller 104 as a timing slave for the cluster 124 (block 410) if that controller 104 determines that it should not serve as the timing master for the cluster 124 and associated radio points 106. As used here, a "slave controller" 104 refers to any controller 104 that is serving as a timing slave for the cluster 124 and associated radio points 106. When a controller 104 serves as a timing slave for the cluster 124, it receives synchronization messages transmitted from the master controller 104 over the front-haul switched Ethernet network 120 (the low PDV network) (block 412) and uses the received synchronization messages to synchronizes its local clock 320 with the local clock 320 of the master controller 104 (block 414). This is also illustrated in FIG. 5.

As noted above, the radio points 106 also receive the synchronization messages transmitted from the master controller 104 over the front-haul switched Ethernet network 120 (the low PDV network) and use the received synchronization messages to synchronize their local clocks 220 with the local clock 320 of the master controller 104.

With the clock distribution scheme illustrated in FIG. 4, each of the controllers 104 in the cluster 124 need not independently synchronize its local clock 320 with the external master clock source 128 over the high PDV network (backhaul 116). Instead, one of the controllers 104 in the cluster 124 (the master controller 104) synchronizes its local clock 320 with the external master clock source 128 over the high PDV network, while the other controllers 104 in the cluster 124 (the slave controllers 104) and the radio points 106 synchronize their local clocks 320 and 220 to the master controller 104 over a low PDV network (the fronthaul switched Ethernet network 120). As a result, the differential errors among the local clocks 320 and 220 of the controllers 104 and the radio points 106 should be sufficiently small. Also, by having the radio points 106 synchronize their local clocks 220 with the local clock 320 of the master controller 104 over the low PDV network (the fronthaul switched Ethernet network 120), the clocks 220 of the radio points 106 will have tight synchronization to the local clock 320 of the master controller 104. This is an improvement over the relatively poor synchronization between the various local clocks 220 of the radio points 106 that would result if, in contrast to approach described here, each of the radio points 106 were to independently synchronize its local clock 220 with the external master clock source 128 over the high PDV network (backhaul 116).

FIG. 6 comprises a high-level flowchart illustrating one exemplary embodiment of a method 600 of designating a timing master for a C-RAN 100. The embodiment of method 600 shown in FIG. 6 is described here as being implemented using the C-RAN 100, radio points 106, and controllers 104 described above in connection with FIGS. 1, 2A-2B, 3, and 5, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

In general, the processing associated with method 600 is performed by each of the controllers 104 in the cluster 124 (and, in particular, at least in part by the clock synchronization software 322 in each controller 104).

Method 600 comprises determining, by each controller 104, a quality metric for its connection with the external master clock source 128 over the backhaul 116 (block 602) and communicating it to the other controllers 104 in the cluster 124 over the fronthaul 118 (block 604). Although only one controller 104 at a time serves as the timing master for the cluster 124 and synchronizes its local clock 320 with the external master clock source 128, each controller 104 in the cluster 124 establishes a connection with the external master clock source 128 over the backhaul network 116. Periodically, each controller 104 determines a quality metric for its connection with the master clock source 128. This quality metric is also referred to here as the "connection quality metric." In one implementation, the connection quality metric is based on the packet delay variation (PDV) for packets that are communicated between that controller 104 and the external master clock source 128. In this exemplary embodiment, each controller 104 can calculate a moving average of the PDV measurements made during a predetermined period for that controller's 104 connection with the external master clock source 128. Then, each controller 104 transmits a message including the current value of the moving average to the other controllers 104 in the cluster 124 over the front-haul switched Ethernet network 120. This is also illustrated in FIG. 5.

Method 600 further comprises receiving, by each controller 104, connection quality metrics determined by the other controllers 104 in cluster 124 for their connections with the external master clock source 128 (block 606). In this exemplary embodiment, each of the controllers 104 in the cluster 124 receives messages from the other controllers 104 that include the current value of the moving average of the PDV determined by the other controllers 104 for their connections with the external master clock source 128. By doing this, each of the controllers 104 will have connection quality metrics for itself and each of the controllers 104 in the cluster 124, which can be used to determine a new timing master in the event that it is necessary to do so.

Method 600 further comprises determining by each controller 104, when a new timing master needs to be determined (block 608). For example, this determination needs to be made when the timing master for the cluster 124 fails or is otherwise no longer able to serve as the timing master. In this exemplary embodiment, each controller 104 can make this determination based on whether or not it has received, within a predetermined timeout period, a predetermined message (for example, a recent IEEE 1588 synchronization message or heartbeat message) from the master controller 104.

If a new timing master does not need to be determined at that time, each controller 104 remains in its current role (block 610).

If the master controller 104 has failed (or if a new timing master otherwise needs to be determined), each slave controller 104 determines if it should serve as the timing master for the cluster 124. In this exemplary embodiment, the slave controller 104 having the best connection quality metric should serve as the timing master for the cluster 124 and associated radio points 106 (assuming that the slave controller 104 has itself not otherwise failed). That is, each slave controller 104 compares its current connection quality metric with the current connection quality metrics for the other slave controllers 104 in the cluster 124 (as reported in the messages received from those other controllers 104). If a slave controller 104 has the best current connection quality metric among the other slave controllers 104 in the cluster 124 (block 612), that slave controller 104 should transition to serving as the time master for the cluster 124 and associated radio points 106 (block 614) and perform the acts described above in connection with blocks 404-408 of FIG. 4.

Otherwise, each slave controller 104 remains a slave controller 104 and synchronizes itself to the new master controller 104 (block 616). That is, if there has been a failure of a master controller 104 and a different controller 104 is now serving as the master controller 104, each slave controller 104 will recognize the new master controller 104 and synchronize to that master controller 104 as described above in connection with blocks 410-414.

Although a particular connection quality metric (packet delay variation) has been described in connection with FIG. 6, it is to be understood that other connection quality metrics can be used in addition to or instead of the one described above.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a central radio access network (C-RAN) system comprising: a plurality of controllers; and a plurality of radio points; wherein each of the controllers and radio points comprises a respective local clock; wherein each of the radio points is associated with at least one antenna and is remotely located from the controllers, wherein the plurality of radio points is communicatively coupled to the controllers using a fronthaul network; wherein the controllers and the plurality of radio points are configured to implement a plurality of base stations in order to provide wireless service to a plurality of user equipment (UEs); wherein each of the controllers is communicatively coupled to a core network of a wireless service provider over a backhaul network; wherein each of the controllers is communicatively coupled to a master clock source over the backhaul network; wherein each of the controllers is configured to: determine if that controller should serve as a timing master for the controllers and the radio points; if that controller should serve as the timing master, serve, by that controller, as the timing master for the controllers and the radio points; synchronize the local clock of that controller with the master clock source over the backhaul network; and transmit synchronization messages from that controller over the fronthaul network for reception by the other controllers and the radio points and for use by the other controllers and the radio points in synchronizing the local clocks thereof with the local clock of that controller.

Example 2 includes the system of Example 1, wherein each of the controllers is configured to: determine a respective connection quality metric for a respective connection between that controller and the master clock source over the backhaul network; and communicate the respective connection quality metric to the other controllers; and wherein each of the controller is configured to transition to serving as the timing master for the controllers and the radio points if that controller is not currently serving as the timing master, another controller that is currently serving as the timing master has failed, and that controller has the best of the connection quality metrics determined for the controllers.

Example 3 includes the system of Example 2, wherein each connection quality metric is based on a packet delay variation (PDV) metric determined for the respective connection with the master clock source over the backhaul network.

Example 4 includes the system of any of the Examples 1-3, wherein the controllers and the radio points are configured to use the IEEE 1588 protocol for clock synchronization.

Example 5 includes the system of any of the Examples 1-4, wherein at least one of the radio points comprises a multi-carrier radio point.

Example 6 includes the system of any of the Examples 1-5, wherein at least one of the radio points comprises a single-carrier radio point.

Example 7 includes the system of any of the Examples 1-6, wherein the fronthaul network comprises a network having a low packet delay variation (PDV), and the backhaul network comprises a network having a high packet delay variation (PDV).

Example 8 includes the system of any of the Examples 1-7, wherein the fronthaul network comprises a local area network and the backhaul network comprises a wide area network.

Example 9 includes the system of any of the Examples 1-8, wherein the fronthaul network comprises a switched Ethernet network.

Example 10 includes the system of any of the Examples 1-9, wherein the backhaul network comprises the Internet.

Example 11 includes a method of distributing a clock in a central radio access network (C-RAN) system comprising a plurality of controllers and a plurality of radio points, wherein each of the controllers and radio points comprises a respective local clock, wherein each of the radio points is associated with at least one antenna and is remotely located from the controllers, wherein the plurality of radio points is communicatively coupled to the controllers using a fronthaul network, wherein the controllers and the plurality of radio points are configured to implement a plurality of base stations in order to provide wireless service to user equipment, wherein each of the controllers is communicatively coupled to a core network of a wireless service provider over a backhaul network, and wherein each of the controllers is communicatively coupled to a master clock source over the backhaul network, the method comprising: determining if a first of the controllers should serve as a timing master for the controllers and the radio points; if said first controller should serve as the timing master, serving, by said first controller, as the timing master for the controllers and the radio points; synchronizing the local clock of said first controller with the master clock source over the backhaul network; and transmitting synchronization messages from said first controller over the fronthaul network for reception by the other controllers and the radio points and for use by the other controllers and the radio points in synchronizing the local clocks thereof with the local clock of said first controller.

Example 12 includes the method of Example 11, further comprises: determining a respective connection quality metric for a respective connection between said first controller and the master clock source over the backhaul network; communicating the respective connection quality metric to the other controllers; and receiving respective connection equality metrics determined for the other controllers; and wherein said first controller should transition to serving as the timing master if said first controller is not currently serving as the timing master, another controller that is currently serving as the timing master has failed, and said first controller has the best of the connection quality metrics determined for the controllers.

Example 13 includes the method of Example 12, wherein each connection quality metric is based on a packet delay variation (PDV) metric determined for the respective connection with the master clock source over the backhaul network.

Example 14 includes the method of any of the Examples 11-13, wherein the controllers and the radio points are configured to use the IEEE 1588 protocol for clock synchronization.

Example 15 includes the method of any of the Examples 11-14, wherein at least one of the radio points comprises a multi-carrier radio point.

Example 16 includes the method of any of the Examples 11-15, wherein at least one of the radio points comprises a single-carrier radio point.

Example 17 includes the method of any of the Examples 11-16, wherein the fronthaul network comprises a network having a low packet delay variation (PDV), and the backhaul network comprises a network having a high packet delay variation (PDV).

Example 18 includes the method of any of the Examples 11-17, wherein the fronthaul network comprises a local area network and the backhaul network comprises a wide area network.

Example 19 includes the method of any of the Examples 11-18, wherein the fronthaul network comprises a switched Ethernet network.

Example 20 includes the method of any of the Examples 11-19, wherein the backhaul network comprises the Internet.

What is claimed is:

1. A central radio access network (C-RAN) system comprising:
   a plurality of base stations, the plurality of base stations comprising:
      a plurality of controllers; and
      a plurality of radio points;
   wherein each of the controllers and the radio points comprises a respective local clock;
   wherein each of the radio points is associated with a respective at least one antenna, wherein the plurality of radio points is communicatively coupled to the controllers using a fronthaul network;
   wherein the controllers and the plurality of radio points are configured to implement the plurality of base stations in order to provide wireless service to a plurality of user equipment (UEs), each of the controllers configured to perform at least some air-interface Layer 2 processing for one or more of the base stations;
   wherein each of the controllers is communicatively coupled to a core network of a wireless service provider over a backhaul network;
   wherein each of the controllers is communicatively coupled to a master clock source over the backhaul network;
   wherein each of the controllers is configured to:
      determine if that controller should serve as a timing master for the controllers and the radio points;
      if that controller should serve as the timing master, serve, by that controller, as the timing master for the controllers and the radio points;
      synchronize the local clock of that controller with the master clock source over the backhaul network; and
      transmit synchronization messages from that controller over the fronthaul network for reception by the other controllers and the radio points and for use by the other controllers and the radio points in synchronizing the local clocks thereof with the local clock of that controller.

2. The system of claim 1, wherein each of the controllers is configured to:

determine a respective connection quality metric for a respective connection between that controller and the master clock source over the backhaul network; and communicate the respective connection quality metric to the other controllers; and wherein each of the controller is configured to transition to serving as the timing master for the controllers and the radio points if that controller is not currently serving as the timing master, another controller that is currently serving as the timing master has failed, and that controller has the best of the connection quality metrics determined for the controllers.

3. The system of claim 2, wherein each connection quality metric is based on a packet delay variation (PDV) metric determined for the respective connection with the master clock source over the backhaul network.

4. The system of claim 1, wherein the controllers and the radio points are configured to use the IEEE 1588 protocol for clock synchronization.

5. The system of claim 1, wherein at least one of the radio points comprises a multi-carrier radio point.

6. The system of claim 1, wherein at least one of the radio points comprises a single-carrier radio point.

7. The system of claim 1, wherein the fronthaul network comprises a network having a low packet delay variation (PDV), and the backhaul network comprises a network having a high packet delay variation (PDV).

8. The system of claim 1, wherein the fronthaul network comprises a local area network and the backhaul network comprises a wide area network.

9. The system of claim 1, wherein the fronthaul network comprises a switched Ethernet network.

10. The system of claim 1, wherein the backhaul network comprises the Internet.

11. A method of distributing a clock in a central radio access network (C-RAN) system comprising a plurality of base stations, the plurality of base stations comprising a plurality of controllers and a plurality of radio points, wherein each of the controllers and the radio points comprises a respective local clock, wherein each of the radio points is associated with at least one antenna, wherein the plurality of radio points is communicatively coupled to the controllers using a fronthaul network, wherein the controllers and the plurality of radio points are configured to implement the plurality of base stations in order to provide wireless service to a plurality of user equipment (UEs), each of the controllers configured to perform at least some air-interface Layer 2 processing for one or more of the base stations, wherein each of the controllers is communicatively coupled to a core network of a wireless service provider over a backhaul network, and wherein each of the controllers is communicatively coupled to a master clock source over the backhaul network, the method comprising:

determining if a first of the controllers should serve as a timing master for the controllers and the radio points;

if said first controller should serve as the timing master, serving, by said first controller, as the timing master for the controllers and the radio points;

synchronizing the local clock of said first controller with the master clock source over the backhaul network; and transmitting synchronization messages from said first controller over the fronthaul network for reception by the other controllers and the radio points and for use by the other controllers and the radio points in synchronizing the local clocks thereof with the local clock of said first controller.

12. The method of claim 11, further comprises:

determining a respective connection quality metric for a respective connection between said first controller and the master clock source over the backhaul network;

communicating the respective connection quality metric to the other controllers; and receiving respective connection equality metrics determined for the other controllers; and wherein said first controller should transition to serving as the timing master if said first controller is not currently serving as the timing master, another controller that is currently serving as the timing master has failed, and said first controller has the best of the connection quality metrics determined for the controllers.

13. The method of claim 12, wherein each connection quality metric is based on a packet delay variation (PDV) metric determined for the respective connection with the master clock source over the backhaul network.

14. The method of claim 11, wherein the controllers and the radio points are configured to use the IEEE 1588 protocol for clock synchronization.

15. The method of claim 11, wherein at least one of the radio points comprises a multi-carrier radio point.

16. The method of claim 11, wherein at least one of the radio points comprises a single-carrier radio point.

17. The method of claim 11, wherein the fronthaul network comprises a network having a low packet delay variation (PDV), and the backhaul network comprises a network having a high packet delay variation (PDV).

18. The method of claim 11, wherein the fronthaul network comprises a local area network and the backhaul network comprises a wide area network.

19. The method of claim 11, wherein the fronthaul network comprises a switched Ethernet network.

20. The method of claim 11, wherein the backhaul network comprises the Internet.

* * * * *